Patented Feb. 11, 1930

1,746,944

UNITED STATES PATENT OFFICE

REED W. HYDE, OF SUMMIT, NEW JERSEY, ASSIGNOR TO DWIGHT AND LLOYD METAL-
LURGICAL COMPANY, OF NEW YORK, N. Y., A CORPORATION OF NEW JERSEY

PROCESS OF CEMENT MANUFACTURE

No Drawing.      Application filed March 26, 1927. Serial No. 178,818.

This invention relates to a process for manufacturing cement and more particularly to a process for heat treating raw materials in order to form cement therefrom.

The invention further relates to a two-stage process for the manufacture of cement in which finely divided raw material is partly burned and formed into a cake and the cake is then further heated to produce cement clinker.

The invention still further relates to a method of subjecting a calcined agglomerate to a finishing heat treatment for effecting the chemical change required to produce cement clinker.

In certain prior processes for the manufacture of cement, raw materials have been slowly heated to a high finishing heat to form a fused cake or clinker which was subsequently pulverized. The raw materials were first finely ground and then thoroughly mixed and this mixture was burned either in a rotary kiln or a furnace. The product was in a fused condition comprising nodules or relatively large dense cakes which were subsequently broken up and pulverized to form the required finely divided finished product. Both Portland and high alumina cements have frequently been made by the above processes which however were slow, consumed a large amount of fuel and required plants which were built at a considerable expense per unit of capacity.

The present invention provides a cement manufacturing process in which the material is treated in two steps comprising first calcining and sintering finely divided raw material to produce a porous sinter cake and subsequently heating the sinter cake at a comparatively high temperature for a short period of time. The sinter cake may be formed with extreme rapidity from finely ground particles and is then in a suitable condition for further brief treatment in a blast furnace or rotary kiln. Furthermore the sinter cake, being of comparatively large size, may be subjected to this heat treatment without loss of dust. The time required to burn the sinter that is, to complete the chemical transformation to the cement compounds is comparatively short because of its open structure which exposes enormous surfaces to the heat and because the cake has already been calcined and partially burned while being formed. In fact the time required to carry on both steps—that is sintering and burning in a kiln or furnace—is considerably less than that required to burn the entire material directly in a kiln or furnace without interposing the step of sintering.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. Since such illustration is however, primarily for purposes of disclosure it will be understood that the processes and the steps thereof may be modified in various respects without departing from the spirit and scope of the invention.

In the following description and in the claims the various steps in the process and the details comprising the invention will be identified by specific names for convenience but they are intended to be as generic in their application as the art will permit.

As a specific example this invention may be carried on by finely grinding if necessary, the raw materials and thoroughly mixing the same with a small proportion of solid fuel such as coal, coke or other carbonaceous matter.

The fine mixture may be sintered on any well known type of sintering machine, for example, in a machine such as that disclosed in Patent No. 1,027,110, dated May 21, 1912, to A. S. Dwight, a partial burning of materials taking place with the formation of an open cellular cake. A typical sinter formed on such a machine is disclosed in Patent No. 1,020,345, dated March 12, 1912 to Dwight and Lloyd. It is well known that a sinter cake is formed by momentarily bringing the particles of material to a state of incipient fusion by internal combustion and passing air through the mass while in this condition. The fused particles are blown or frothed by the air into a comparatively open structure and since the fusion is only momentary the mass cools and hardens to form porous cakes.

The sinter cake, which during its process of formation has been subjected to a portion only of the heat required to completely convert it to the cement compound, may be partially broken up if desired and charged directly into a blast furnace or a rotary kiln where it may be treated for a brief time at a temperature sufficiently high to convert the components to cement compounds, commonly known as cement clinkers. Then clinkers may then be removed from the furnace and pulverized in any well known manner to form the finished cement.

This treatment may be carried on with extreme rapidity due to the open structure of the sinter which enables the hot gases to contact with the large surface area of the cake and also due to the preliminary heating during the formation of the sinter in which a partial burning or conversion takes place.

The temperature employed both for the sintering step and for the final burning may vary, depending on the composition of the material. As an example however, it has been found that the sintering operation may be carried on at from 1000° C. to 1450° C. and the final burning at 1200° C. to 1600° C. or higher for certain types of material with satisfactory results.

The loss of dust or fines, which formerly resulted from the stream of gases carrying away the fine dust particles, often removing large proportions of certain elements than of others and frequently rendering the finished product nonuniform in composition, is substantially eliminated by this improved process. Consequently a more efficient operation results and the product is of more uniform composition.

The preliminary sintering is a cheap and efficient method of agglomerating the fine raw materials and putting them in the best physical condition for the subsequent high temperature heating or actual melting down, whichever may be desired. In certain cases it may be desirable to mix fine sinter, say ¼" or less, commonly called "returns", back with the sintering charge, and the following charge has been successfully used:

|  | Pounds |
|---|---|
| Raw alumina mix | 100 |
| Fine sintered material | 40 |
| Fine coal | 20 |

By incorporating fine sinter or "returns" with the raw material, the mixture often may be made more permeable to air currents with a consequent increase in rapidity of the sintering operation. The "returns" provides a nucleus about which the raw charge is fused, which further increases the speed of the process. The production may be made more uniform in this manner since the fine material, that is say particles of ¼" or less size, is screened out before the sinter is subjected to the finishing heat. It has been found that the addition of the "returns" to the original charge in many cases not only materially reduces the time required for the sintering operation, but results in the formation of a dense, cellular, strong sinter from raw material otherwise difficult to sinter which is admirably suited for melting down in the shaft furnace or for high temperature treatment in a shorter rotary kiln than that required for the one step process.

It will be seen that this method involves a two-stage treatment for making cement comprising first, sintering the finely divided raw material to a cellular sinter cake which is however, not entirely sufficiently burned to be in itself a satisfactory cement material. This sinter is then melted down or given the necessary high temperature treatment in a suitable form of apparatus, and may then be stored or pulverized for use as cement.

The first product, a sinter cake, may be stored before the final burning for any length of time and without shelter from the weather since it is not affected by atmospheric conditions. Thus, it may be made up in any quantity, stored and then given the finishing treatment at convenience. The process can be carried on with practically no dust loss, with a low over all fuel consumption and at a high rate of speed, since the sintering itself is rapid, and the product is more rapidly burned than is the fine material heretofore treated. The product is uniform due to the low dust loss, and is thoroughly burned, while a minimum amount of attention and labor are required.

Although certain novel features of the invention have been shown and described and are pointed out in the annexed claims, it will be understood that various omissions substitutions and changes in the several steps of the process and its operation may be made by those skilled in the art without departing from the spirit of the invention.

What is claimed is:

1. The process of manufacturing cement clinker which comprises uniformly mixing finely divided raw materials containing a combustible constituent, causing transitory internal combustion of said materials whereby an open cellular cake is produced and subjecting said cake to a relatively high finishing heat.

2. The process of manufacturing cement clinker which comprises finely dividing the raw material and thoroughly mixing the same with a suitable proportion of fuel, causing transitory internal combustion of said mixture whereby an open cellular cake is produced, and subjecting said cake to a relatively high finishing heat.

3. The process of manufacturing cement which comprises pulverizing the raw material, mixing the same with fine partially sintered material and fine fuel, causing a transitory internal combustion of said mixture whereby an open cellular cake is produced, subjecting said cake to a relatively high finishing heat and pulverizing the resultant product to form cement.

4. The process of manufacturing cement from an aluminum bearing material which comprises pulverizing said material, adding thereto finely divided coal in sufficient quantities to support internal combustion, causing transitory internal combustion of said mixture whereby an open cellular cake is produced, subjecting said cake to a relatively high finishing heat and pulverizing the resultant product to form cement.

In testimony whereof I have hereunto set my hand.

REED W. HYDE.